United States Patent [19]

Scholl et al.

[11] Patent Number: 5,154,128
[45] Date of Patent: Oct. 13, 1992

[54] PROCESS FOR SALVAGING WASTE AND DEVICE FOR PREPARING SAID WASTE

[75] Inventors: Gerhard Scholl, Spiesen-Elversberg; Hans-Karl Petzel, Scheidt; Lothar Stadie, Höchstadt, all of Fed. Rep. of Germany

[73] Assignees: Saarbergwerke Aktiengesellschaft, Saarbücken; Siemens Aktiengesellschaft, Munich, both of Fed. Rep. of Germany

[21] Appl. No.: 623,917

[22] PCT Filed: Mar. 30, 1990

[86] PCT No.: PCT/DE90/00253
§ 371 Date: Jan. 31, 1991
§ 102(e) Date: Jan. 31, 1991

[87] PCT Pub. No.: WO90/12986
PCT Pub. Date: Nov. 1, 1990

[30] Foreign Application Priority Data
Apr. 15, 1989 [DE] Fed. Rep. of Germany .... 3912450.9

[51] Int. Cl.⁵ ................................................ F23B 7/00
[52] U.S. Cl. ..................................... 110/341; 110/222; 110/346
[58] Field of Search ............... 110/222, 224, 227, 234, 110/341, 346

[56] References Cited
U.S. PATENT DOCUMENTS

| | | | |
|---|---|---|---|
| 2,026,366 | 12/1935 | Stehli | 110/222 |
| 2,213,668 | 9/1940 | Dundas et al. | 110/222 |
| 3,670,669 | 6/1972 | Hoad . | |
| 4,121,524 | 10/1978 | Voelskow et al. | 110/222 |
| 4,133,273 | 1/1979 | Glennon | 110/346 |
| 4,750,437 | 6/1988 | Rouse | 110/346 |

FOREIGN PATENT DOCUMENTS
53-118872 10/1978 Japan .

OTHER PUBLICATIONS
Strobach, "Energie aus Abfall", Organ Der Osterreichischen Gesellschaft Fur Natur-Und Umweltschutz, pp. 87–88 (Germany 1981).
Schlotmann, "Erste Erfahrungen mit der gemeinsamen . . . ", VGB Kraftwerkstechnik 57, pp. 552–558 (Germany 1977).
Wisely et al., "Use of Refuse as Fuel in an Existing Utility Boiler", 44:4, 38–41 (U.S.A. 1972).

Primary Examiner—Henry C. Yuen
Attorney, Agent, or Firm—James Creighton Wray

[57] ABSTRACT

The waste (a) is dried in direct heat exchange with hot exhaust gas (r) from a coal-burning plant (10) and both the gas mixture (g) produced during drying (3) and the dry material (t) produced from the waste are fed into the coal-burning plant.

8 Claims, 1 Drawing Sheet

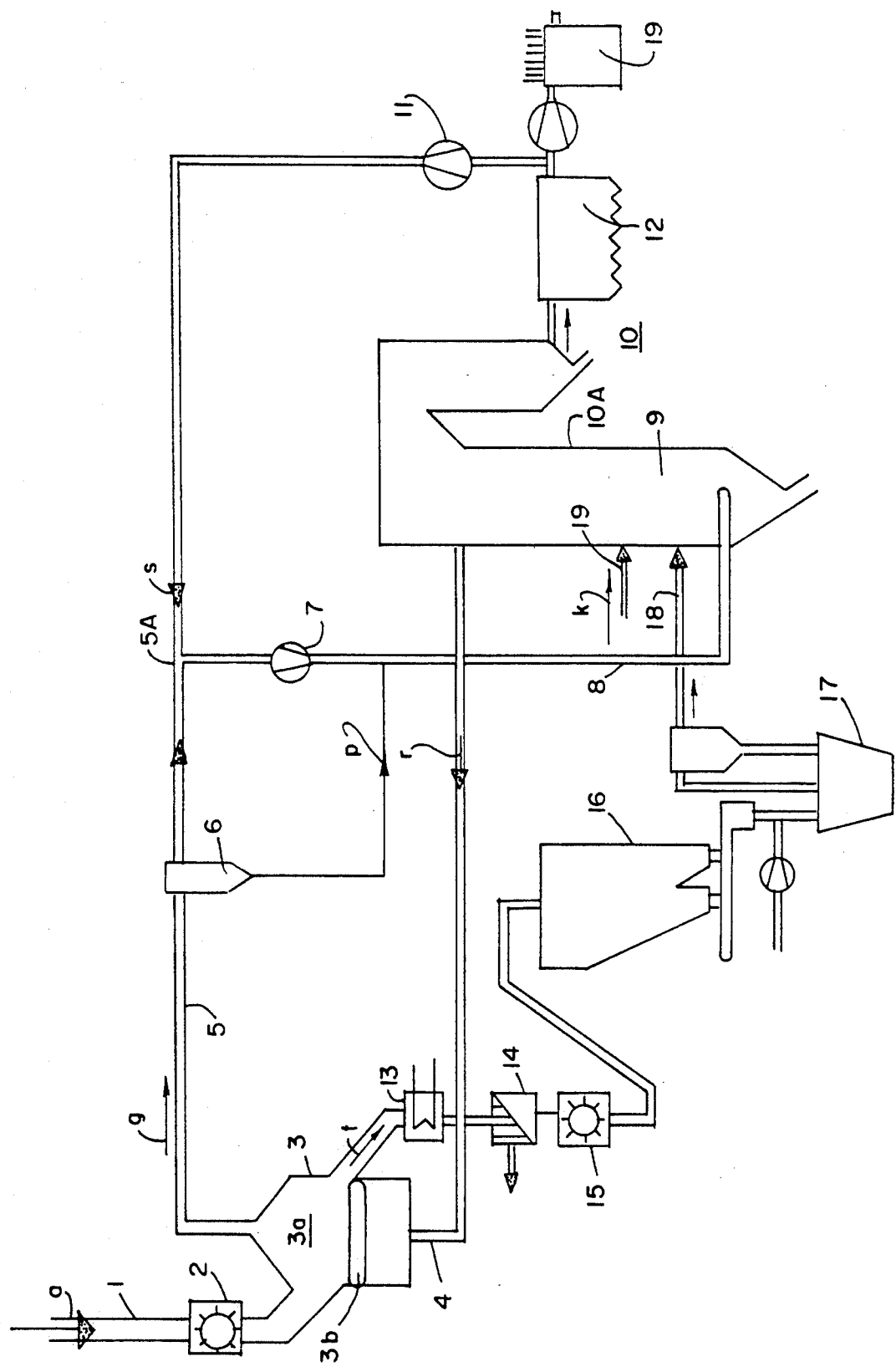

PROCESS FOR SALVAGING WASTE AND DEVICE FOR PREPARING SAID WASTE

BACKGROUND OF THE INVENTION

The invention relates to a process for thermal salvage of waste materials containing organic components as well as a device for the thermal preparation of such waste.

The removal of waste materials containing organic components, such as domestic waste, industrial waste, etc., is at the present time as a rule performed by transport to waste dumps or through burning. The dumping of unsorted waste is very complex and may create new environmental burdens which may e.g. endanger ground water if the dumping grounds are not prepared properly. The establishment of new dumping grounds is also becoming more and more difficult because of permit laws. The dumping of trash or waste is also to a certain degree contrary to the legal stipulation of salvaging waste materials.

One possibility to avoid or reduce dumping problems is the thermal salvaging of waste materials to generate steam and electricity. In this context we already know of grate furnaces in which the waste materials are burned in the state they arrived in. In order to ensure continuous operation of these plants a larger-scale intermediate storage is inevitable if the waste is delivered discontinuously. This results in fermentation and decay processes and thus in odor developments offensive to the surrounding area.

In addition, because of e.g. the sometimes great fluctuations of the waste thermal value the combustion in such grate furnaces is as a rule rather inhomogeneous. This results in relatively high non-burned shares in the slag and fly-ash. This incomplete combustion results in odor problems even in the ash and such ash is in comparison with the ash of e.g. a hard coal power plant much harder to dispose of. Sometimes these ashes must be transported to removed special dumping grounds at high costs. Because of the incomplete combustion it can also not be excluded that highly toxic dioxines, e.g. polychlorinated dibenzodioxine or even polychlorinated dibenzofuranes may be generated if the waste materials contain organic or also inorganic chlorine compounds, e.g. polychlorinated biphenyls (PCB).

SUMMARY OF THE INVENTION

The invention has the task of providing a simple, economical and environmentally harmless process for the thermal salvaging of waste containing organic components. Another aspect is a device for the thermal processing of such waste.

The first task is solved according to the invention in that the waste is dried in direct heat exchange with hot exhaust gas of a coal-burning plant and that both the gas mixture resulting during the drying and the dry material from the waste are fed to the coal-burning plant.

The second task is solved according to the invention by a device which is characterized by a drier which contains a drying chamber and has a) a conveyor section to feed the waste into the drying chamber;
b) a duct to transfer the hot exhaust gas of a power plant into the drying chamber;
c) a duct to transfer the gas mixture generated in the drying chamber to the combustion zone of the power plant; and
d) a solid material conveyor section to transport the solid dry material obtained in the drying chamber to the combustion zone of the power plant.

With the help of the invented measures it is possible to exploit the advantages of a coal-burning plant with an extraordinarily high combustion rate and correspondingly high combustion efficiency, such as they exist e.g. in steam generators of hard coal power plants with dry or liquid ash removal, also for the combustion of inhomogeneous waste. With the high combustion temperatures of a coal-burning plant which far exceed 1000° C., environmentally compatible reaction products are even produced when relatively problematic wastes, such as plastics of all types as well as PCB-containing components, etc. are burned. The production of toxic dioxines or furanes is avoided from the start, or such compounds which are possibly produced as intermediate reaction products are safely broken down again at the high combustion temperatures.

The two fractions which are created because of the drying of the waste proposed here, i.e. the dry material and the gas mixture which contains combustible components may in contrast to untreated waste be burned without problems in a high-efficiency coal-burning plant with dry or liquid ash removal, e.g. in a hard coal power plant. The dry material may be ground together with or separate from the coal to the necessary grain size and may then be thermally reacted by way of the normal furnace(s) already provided in the kettle.

It is useful that the share of dry material used in place of coal is smaller than or equal to 20% relative to the total fuel volume because it was found that with dry material shares in the mentioned magnitude up to 20%, the typical combustion reactions of a coal-burning plant are not, or are only insignificantly affected.

This hardly changes the exhaust gas composition. The range of noxious content of the exhaust gas acceptable for the use of various coal types is in no case exceeded by the measured addition of waste fuel between 0 and 20%. This is not only true for the sulfur and nitrogen oxides in the exhaust gas but also for chlorides, fluorides, and in particular for toxic substances such as dioxines and furanes. Such noxious substances as dioxines and furanes could not even be found in the performed experiments.

According to the invented suggestion it is possible e.g. in a standard hard coal power plant with a 700 MW output and an annual hard coal use of ca. 1 million tons to use ca. 100,000 to 200,000 tons of dried waste fuel without affecting the operation of the power plant.

BRIEF DESCRIPTION OF THE INVENTION

The drawing is a schematic representation of a thermal salvage process according to the invention.

The following refers to the schematic example shown in the drawing.

According to the drawing, the process is based on already prepared waste (a) with organic components, i.e. waste which underwent rough sorting and from which recyclable rough components such as glass bottles, larger metal pieces, etc. were separated. The waste (a) is first transported via a conveyor section (1) to a comminution mechanism (2), e.g. rotating shears, and is there comminuted to a predetermined size. Then the waste (a) is fed to a drying chamber (3a) of a dryer with screen floor, grate or conveyor belt (3b). The waste is dried in direct heat exchange with exhaust gas (r) of a hard coal power plant (10) which has not yet been dedusted and which is fed at a temperature of ca. 800° C. via a duct (4) and the screen floor (3b) into the drying chamber (3a) of the dryer (3). By varying the staying time of the exhaust gas (r) in the dryer (3) or the exhaust gas volume the drying temperature may be adjusted to a predetermined level below 800° C.

In particular, at higher temperatures, easily volatile and mostly odor-intensive substances are, in addition to water, already separated from the raw waste (a) during this process.

The gas mixture (g) produced in the dryer (3) is withdrawn by an upward draft blower (7) via a duct (8) from the drying chamber (3a) and is fed via a duct (8) into the dry combustion zone (9) of the kettle (10A) of the hard coal power plant (10). The dust (s) accompanying the gas mixture (g) is separated in a dust separator (6) in order to protect the upward draft blower (7) and is then again fed into the gas mixture (g) behind the upward draft blower (7). The temperature of the gas mixture (g) from the dryer (3) may be adjusted to an operating temperature which is compatible with the upward draft blower (7) by adding a cold exhaust gas stream (s) which is withdrawn with a cooling fan (11) behind the electric filter (12) of the power plant (10) and is added at a mixing point (5A) in the duct (5).

The combustible components of the gas mixture (g) are burned completely and environmentally harmlessly in the dry combustion zone (9) at the temperatures which are present there.

The solid dry material (t) which is obtained in the drying chamber (3a) of the dryer (3) is first cooled on a solid material conveyor section (18) in a roast material cooler (13) and then undergoes a metal separation in a magnetic separator (14). It is then comminuted in a hammer mill (15) and is then intermediately stored in dry material hopper (16). From the dry material hopper (16) the dry material (t) passes a vibrator mill (17) with corresponding fan in which it is ground to a grain size range compatible with the power plant furnace. The ground dry material (t) is then burned at the end of the conveyor section (18), e.g. via a conveyor belt together with the coal (k) which is fed via another conveyor section (19), in the dry combustion zone (9). The share of dry material (t) related to the total volume of fuel (k) of the coal-burning plant (10) should be no higher than 20%. As in the case of the gas mixture (g) from the dryer (3), the combustion of the dry material (t) in the combustion zone (9) is at high temperatures complete and environmentally harmless.

The exhaust gas which is produced during the combustion of the waste components (g,t) flows together with the exhaust gas from the coal through the kettle (10A), then through the electric filter (12) and then via a fan through an exhaust gas desulfuration system (19). It is then transferred into the atmosphere.

As shown in the above example, no special installations are required for the processing of exhaust gas from waste and fly-ash. On the contrary, existing infrastructure of the hard coal power plant (10) may be used simply and economically.

If the existing hard coal power plant is a power plant with liquid ash removal, the ash from waste which is produced in the combustor (9) is melted together with the ash of the coal (k). The granulate generated after cooling may, as the granulate of a coal-burning plant, be used by itself for the usual purposes in the construction industry.

We claim:

1. Process for the thermal processing of waste materials containing organic components in a coal dust furnace, comprising a dryer having a drying chamber, a feeder section, a first duct and a second duct, and a conveyor section, comprising the steps of:
   (a) feeding the waste into the drying chamber through the feeder section;
   (b) supplying flue gas in excess of 1000° C. from the coal dust furnace to the drying chamber via the first duct;
   (c) transferring a gas mixture generated in the drying chamber to a combustion zone of the coal dust furnace via the second duct;
   (d) conveying dry material from the drying chamber to the combustion zone of the coal dust furnace via the conveyor section;
   (e) supplying coal dust to the combustion zone in the ratio of approximately 4 to 1 or greater by volume to the dry material; and
   (f) burning the gas mixture and dry material in the coal dust furnace.

2. The process of claim 1, wherein the waste is comminuted by a comminution mechanism located in the conveyor section.

3. The process of claim 1, wherein the gas mixture transferred to the coal dust furnace is passed through an upward draft blower connected to the second duct.

4. The process of claim 3, wherein the gas mixture is further passed through a dust separator connected to the second duct.

5. The process of claim 2, wherein the gas mixture is mixed with relatively cool exhaust gas from the coal dust furnace at a mixing point on the second duct.

6. Process according to claim 1, characterized in that the waste materials are additionally degasified during drying.

7. Process according to claim 1, characterized in that the dry material is supplied to a coal dust furnace with liquid ash removal.

8. Process according to claim 1, characterized in that the volume of the gas mixture and/or dry material supplied to the coal dust furnace is controlled dependent on the hazardous substance content in the flue gas of the coal dust furnace.

* * * * *